United States Patent
Tsai et al.

(10) Patent No.: US 8,055,189 B2
(45) Date of Patent: Nov. 8, 2011

(54) WIRELESS COMMUNICATION SYSTEM, METHOD, AND TANGIBLE MACHINE-READABLE MEDIUM THEREOF FOR TRANSMITTING DATA BASED ON A FRAME STRUCTURE OF A MULTI-HOP RELAY STANDARD

(75) Inventors: Yi-Hsueh Tsai, Taipei County (TW); Chih-Chiang Hsieh, Kaohsiung County (TW); Kan-Chei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 930 days.

(21) Appl. No.: 11/833,573

(22) Filed: Aug. 3, 2007

(65) Prior Publication Data

US 2008/0031181 A1 Feb. 7, 2008

Related U.S. Application Data

(60) Provisional application No. 60/821,320, filed on Aug. 3, 2006.

(51) Int. Cl.
*H04B 7/14* (2006.01)
(52) U.S. Cl. .......................................... 455/15; 370/315
(58) Field of Classification Search .................. 370/310, 370/315, 328, 329, 330, 336; 455/7, 8, 15, 455/16
See application file for complete search history.

(56) References Cited

U.S. PATENT DOCUMENTS

| | | | |
|---|---|---|---|
| 2006/0165161 A1* | 7/2006 | Kim et al. ..................... | 375/222 |
| 2007/0201392 A1* | 8/2007 | Ramachandran ............. | 370/315 |
| 2008/0031180 A1 | 2/2008 | Hsieh et al. | |
| 2008/0049718 A1* | 2/2008 | Chindapol et al. ............ | 370/351 |
| 2009/0303895 A1 | 12/2009 | Zhang et al. | |
| 2009/0303918 A1* | 12/2009 | Ma et al. ....................... | 370/315 |

OTHER PUBLICATIONS

Hoymann et al., "MAC Frame Concepts to Support Multihop Communication in IEEE 802.16 Networks", Wireless World Research Forum, Apr. 2006, 6 pages, Shanghai, China.
Chinese Office Action dated Sep. 18, 2009, 9 pages.
File History for U.S. Publication No. 2008/0031180 A1, Published Feb. 7, 2008.
"Part 16: Air Interface for Fixed Broadband Wireless Access Systems", *IEEE Standard 802.16*, 2004, pp. 1-895.
"Part 16: Air Interface for Fixed and Mobile Broadband Wireless Access Systems, Amendment 2: Physical and Medium Access Control Layers for Combined Fixed and Mobile Operation in Licensed Bands and Corrigendum 1", *IEEE Standard for Local and Metropolitan Area Networks 802.16e*, 2005, pp. 1-864.

* cited by examiner

*Primary Examiner* — Chi Pham
*Assistant Examiner* — Weibin Huang
(74) *Attorney, Agent, or Firm* — Patterson Thuente Christensen Pedersen, P.A.

(57) ABSTRACT

A wireless communication system, a method, and a tangible machine-readable medium thereof for transmitting data based on a frame structure of a multi-hop relay standard are provided. The wireless communication system comprises a base station (BS), a relay station (RS), and a mobile station (MS). The frame structure comprises a relay station map (RS-MAP) frame and an MS sub-frame. The RS-MAP frame describes the frame structure. The MS sub-frame is used for transmitting the first data between the BS and the MS and is used for transmitting a second data between the RS and the MS according to the content of the RS-MAP frame. A part of the second data is the same as the first data.

13 Claims, 6 Drawing Sheets

WIRELESS COMMUNICATION SYSTEM, METHOD, AND TANGIBLE MACHINE-READABLE MEDIUM THEREOF FOR TRANSMITTING DATA BASED ON A FRAME STRUCTURE OF A MULTI-HOP RELAY STANDARD

CROSS-REFERENCES TO RELATED APPLICATIONS

This application claims the benefit of Provisional Application Ser. No. 60/821,320 filed on Aug. 3, 2006.

BACKGROUND OF THE INVENTION

1. Field of the Invention

The present invention relates to a wireless communication system, a method, and a tangible machine-readable medium thereof. More particularly, the present invention relates to a wireless communication system, a method, and a tangible machine-readable medium thereof for transmitting data based on a frame structure of a multi-hop relay standard.

2. Descriptions of the Related Art

With the rapid development of computer networks, various broadband information services are becoming more essential for the information industry. However, due to high costs, only a fraction of all computer users can afford high speed wired broadband services, such as digital subscriber line (DSL) and cable broadband access services. In addition, network telecommunication service providers are looking to expand the coverage range of their wired broadband networks. However, the relevant infrastructure costs for building these wired network prevents them doing so. As a result, many broadband wireless techniques have, hence, become an important alternative. In terms of communication distance, current wireless networks can be classified as follows: wide area network (WAN), metropolitan area network (MAN), local area network (LAN), and personal area network (PAN).

To set up a radio transmission standard for MAN to provide wireless broadband connection as "the last mile" for the telecommunication industry, the IEEE 802.16, a Worldwide Interoperability for Microwave Access (WiMAX), was developed as a wireless transmission standard. After continuous improvement, the IEEE 802.16 has been able to address more market demands, such as various mobile and high speed broadband applications. Moreover, in comparison to other communication techniques, such as Wi-Fi and the third generation mobile communication (3G) technique, the IEEE 802.16 has a larger network bandwidth, lower construction costs, better service quality, better expansibility, and extended usage modes at Wi-Fi hot spots.

Even with its advantages, the communication range and signal quality provided by the IEEE 802.16 are still limited. As a result, the IEEE 802.16j standard Working Group established a mobile multi-hop relay study group in July 2005 for building a mobile multi-hop relay standard (MMR-RS), to establish a multi-hop relay standard (MMR-RS) under the existing IEEE 802.16j standard.

A conventional two-hop relay wireless communication system 1 based on the MMR-RS defined in IEEE 802.16j is illustrated in FIG. 1. The two-hop relay wireless communication system 1 comprises a base station (BS) 101, a relay station (RS) 103, and a plurality of mobile stations (MSs) 105, 107. For brevity, the MSs will be denoted hereinafter as the first MS 105 and second MS 107. One type of frame structure 2 utilized in the aforesaid two-hop relay wireless communication system 1 is illustrated in FIG. 2. The frame structure 2 is allocated by a wireless communication apparatus, such as the BS 101, the RS 103, the first MS 105, or the second MS 107. The frame structure 2 is adapted for data transmission.

The frame structure 2 of the two-hop relay wireless communication system 1 comprises an MS downlink sub-frame 211, an RS downlink sub-frame 213, an MS uplink sub-frame 221, and an RS uplink sub-frame 223. Each of these sub-frames can be used for downlink or uplink data transmission in the two-hop relay wireless communication system 1. The x-axis in FIG. 2 represents the time axis of the frame structure 2, while the y-axis represents the frequency axis.

The MS downlink sub-frame 211 further comprises a pilot message 2111, a frame control header 2113, a downlink MAP 2115, an uplink MAP 2117, and a downlink data allocation 2119. The pilot message 2111 is configured for synchronization between the BS 101 and the second MS 107 or synchronization between the RS 103 and the first MS 105. The frame control header 2113 is configured to describe various parameters of the frame structure 2. The downlink MAP 2115 is configured to broadcast some parameters used for downlink data transmission in the two-hop relay wireless communication system 1, such as connection identifications (CIDs), sub-channel offsets, or time offsets, Similarly, the uplink MAP 2117 is configured to broadcast some parameters used for uplink data transmission in the two-hop relay wireless communication system 1. The downlink data allocation 2119 is configured to transmit data from the BS 101 to the second MS 107 or to transmit data from the RS 103 to the first MS 105. After data transmission of the downlink data allocation 2119, there is a BS/RS-transmission transition gap (BS/RS-TTG) 23 that occurs thereafter.

The RS downlink sub-frame 213 is configured to transmit data from the BS 101 to the RS 103. After transmission of the data of the RS downlink sub-frame 213, there is an RS-receive transition gap (RS-RTG) 24, which occurs after the data transmission.

The MS uplink sub-frame 221 is configured to transmit data from the second MS 107 to the BS 101 or from the first MS 105 to the RS 103. After transmission of the data from the MS uplink sub-frame 221, there is a BS/RS-receive transition gap (BS/RS-RTG) 25 that occurs thereafter.

The RS uplink sub-frame 223 is configured to transmit data from the RS 103 to the BS 101. After transmission of the data of the RS uplink sub-frame 223, the BS-RTG 26 occurs thereafter.

With the frame structure described above, data transmission can proceed successfully in accordance with the IEEE 802.16j standard. For example, the BS 101 and the RS 103 can transmit data respectively via the MS downlink sub-frame 211 and the RS downlink sub-frame 213. However, because data transmission may interfere with other frequency bands at any time, data transmission may be interrupted and thus, not transmitted correctly.

Accordingly, it is important for the mobile communication providers and the mobile communication apparatus manufacturers to find a solution for improving signal immunity against interference and ensuring correct data transmission to extend the communication range of networks using the multi-hop relay standard under IEEE 802.16j.

SUMMARY OF THE INVENTION

One objective of this invention is to provide a method for transmitting data based on a frame structure of a multi-hop relay standard. The method comprises the following steps: allocating a relay station map (RS-MAP) frame in the frame structure to describe the frame structure; and allocating an MS sub-frame in the frame structure according to information of the RS-MAP frame. The MS sub-frame transmits the first data between a BS and an MS, as well as the second data between an RS and the MS, wherein a part of the second data is the same as the first data.

Another objective of this invention is to provide a wireless communication system for transmitting data based on a frame structure of a multi-hop relay standard. The wireless communication system comprises a BS, an MS, and an RS. The frame structure comprises an RS-MAP frame and an MS sub-frame. The RS-MAP frame describes the frame structure. The MS sub-frame which is allocated by information of the RS-MAP frame transmits the first data between the BS and MS, as well as the second data between the RS and MS according to information of the RS-MAP frame. A part of the second data is the same as the first data.

Yet a further objective of this invention is to provide a tangible machine-readable medium having executable code to cause a machine to perform a method for transmitting data based on a frame structure of a multi-hop relay standard. The method comprises the following steps: allocating an RS-MAP frame in the frame structure to describe the frame structure; and allocating an MS sub-frame in the frame structure according to information of the RS-MAP frame. The MS sub-frame transmits the first data between a BS and an MS, as well as the second data between an RS and the MS. A part of the second data is the same as the first data.

The aforesaid method can be executed by wireless communication apparatus, such as a BS, an RS, or an MS in the wireless communication system. By transmitting data based on a frame structure of a multi-hop relay standard, and transmitting a part of the data from both a BS and an RS to an MS, this invention can prevent data transmission failure or forced transmission interruption due to signal interference. As a result, signal immunity is improved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
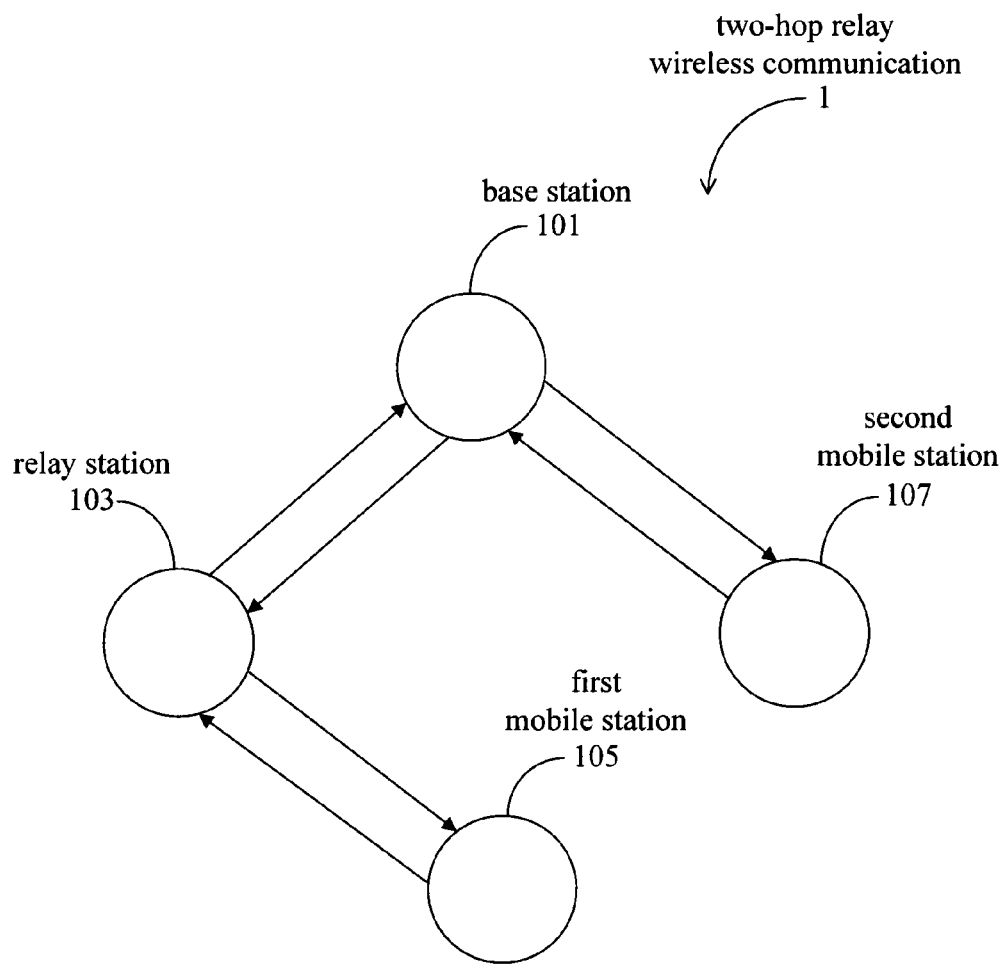
FIG. 1 is a schematic diagram illustrating a conventional two-hop relay wireless communication system based on the MMR-RS defined in IEBE 802.16j.
Figure 2:
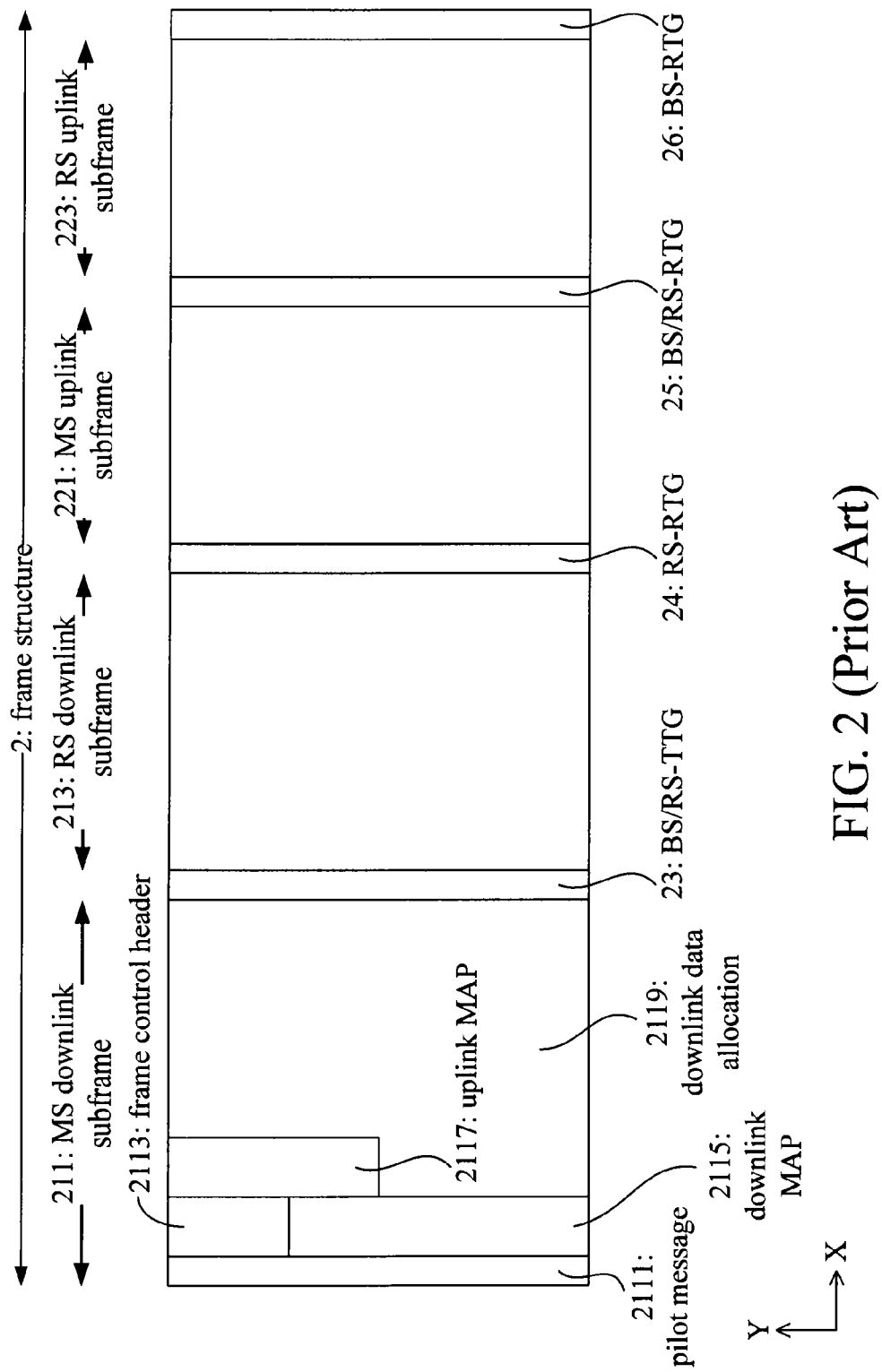
FIG. 2 is a schematic diagram illustrating the frame structure of the conventional two-hop relay wireless communication system.
Figure 3:
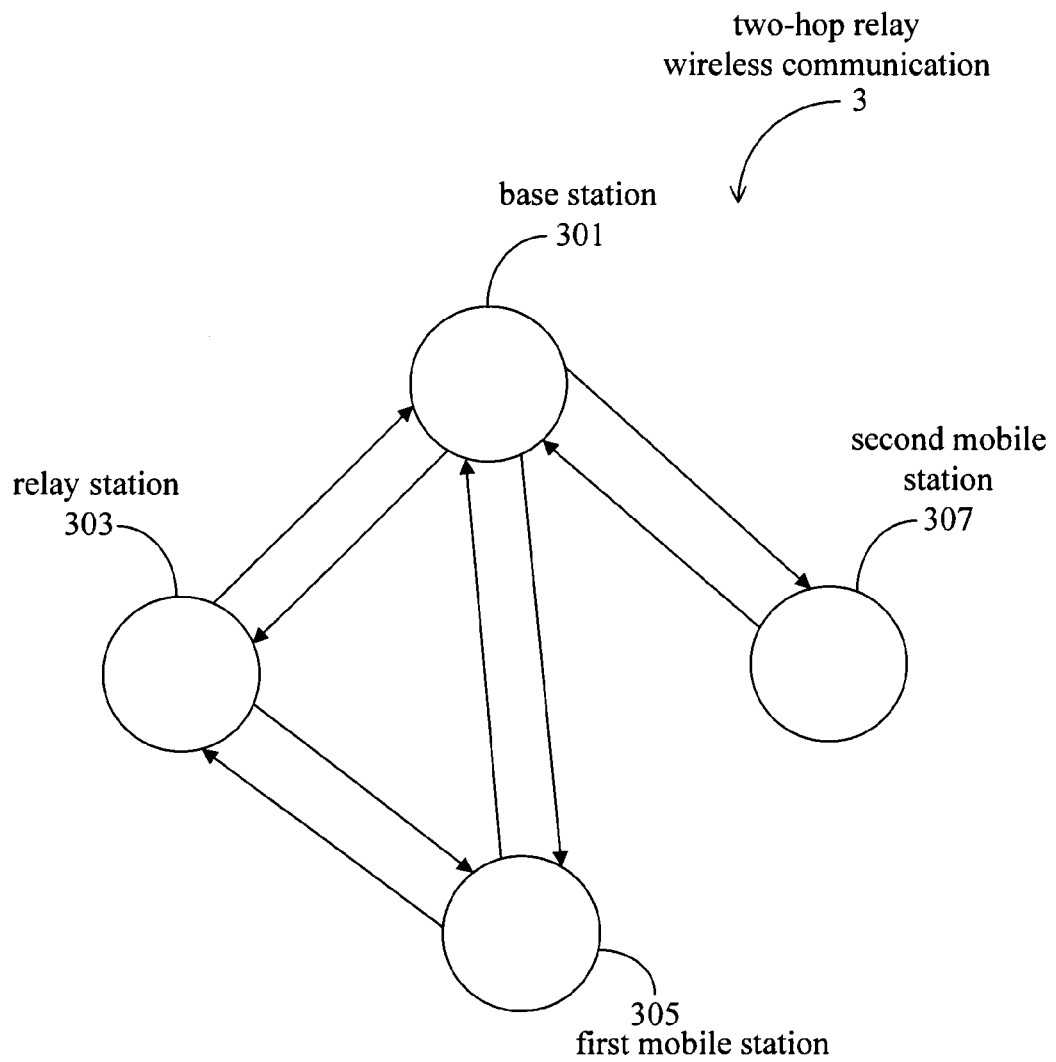
FIG. 3 is a schematic diagram illustrating the first embodiment of this invention.
Figure 4:
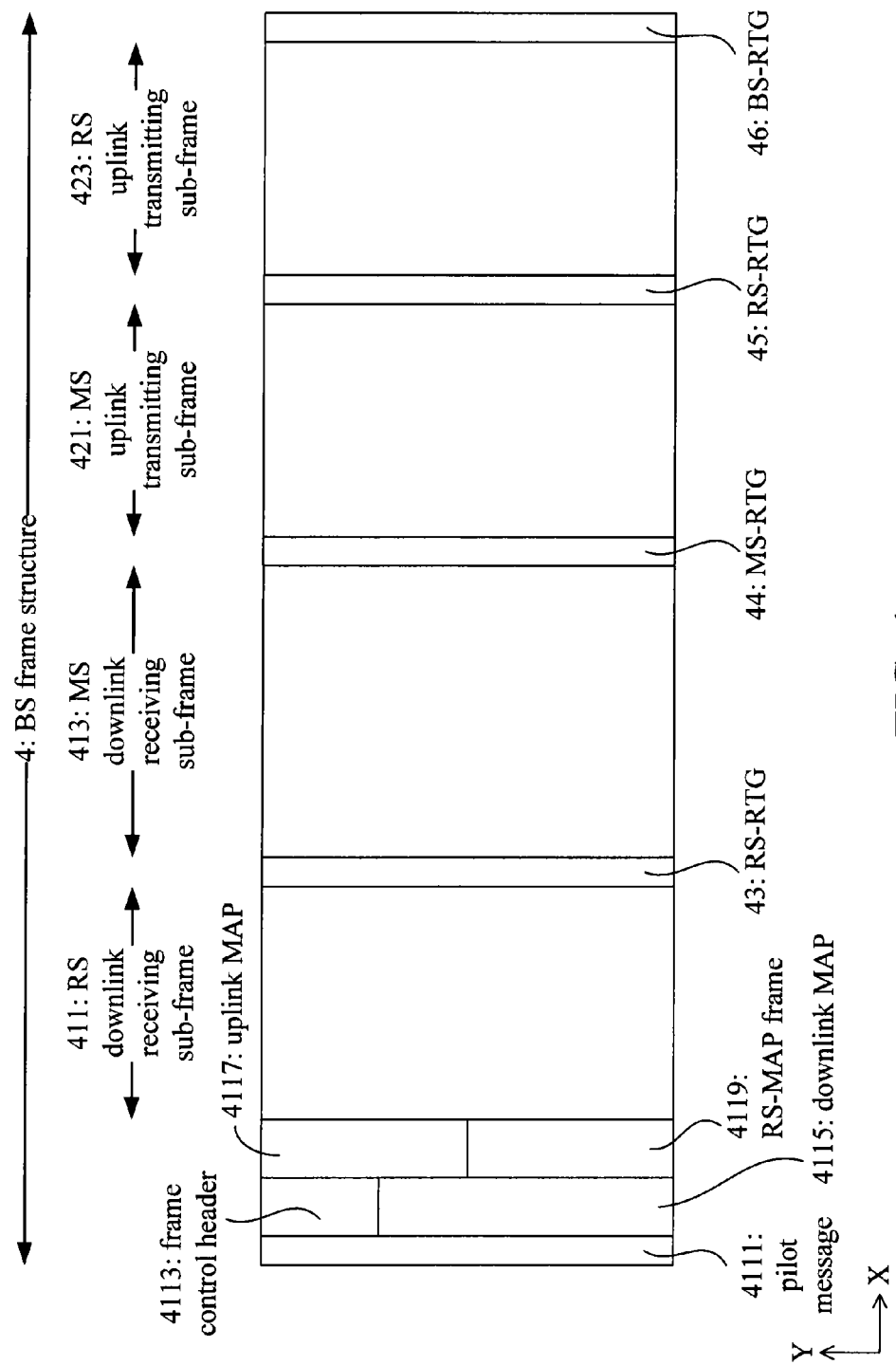
FIG. 4 is a schematic diagram illustrating a BS frame structure employed in the BS of the first embodiment.
Figure 5:
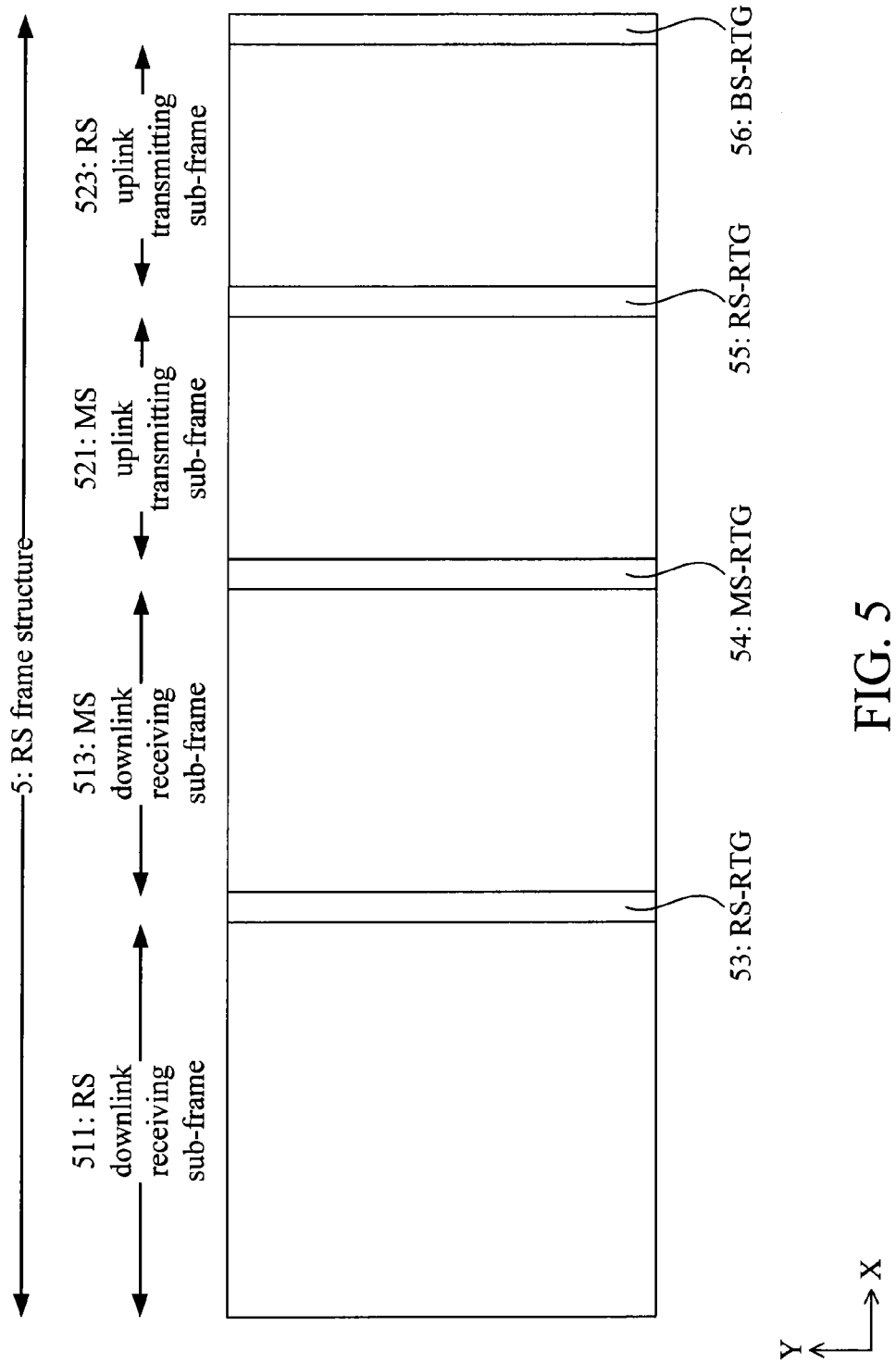
FIG. 5 is a schematic diagram illustrating an RS frame structure employed in the RS of the first embodiment.

As illustrated in FIG. 3, a first embodiment of this invention is a two-hop relay wireless communication system 3 based on the multi-hop relay standard defined in IEEE 802.16j (one of the multi-hop relay standards). The two-hop relay wireless communication system 3 comprises a BS 301, an RS 303, and a plurality of MSs 305, 307. For brevity, the MSs 305, 307 will be denoted hereinafter as a first MS 305 and second MS 307. One type of BS frame structure 4 utilized in the BS 301 is shown in FIG. 4, while one type of RS frame structure 5 utilized in the aforesaid RS 303 is shown in FIG. 5. The frame structures 4, 5, of both are transparent RS frame structures or other kinds of frame structures and are allocated by a wireless communication apparatus (i.e., the BS 301, the RS 303, the first MS 305, or the second MS 307), for transmitting data.

The BS frame structure 4 comprises an RS downlink receiving sub-frame 411, an MS downlink receiving sub-frame 413, an MS uplink transmitting sub-frame 421, and an RS uplink transmitting sub-frame 423. The MS downlink receiving sub-frame 413 and the MS uplink transmitting sub-frame 421 form an MS sub-frame, and the RS downlink receiving sub-frame 411 and the RS uplink transmitting sub-frame 423 form an RS sub-frame. Each of these sub-frames can be used by the BS 301 for downlink or uplink data transmission in the two-hop relay wireless communication system 3. The x-axis in FIG. 4 represents the time axis of the BS frame structure 4, while the y-axis represents the frequency axis.

The BS frame structure 4 further comprises a pilot message 4111, a frame control header 4113, a downlink MAP 4115, an uplink MAP 4117, and an RS-MAP frame 4119. The pilot message 4111 is configured for synchronization among the BS 301, the RS 303, the first MS 305, and the second MS 307. The frame control header 4113 is configured to describe various parameters of the frame structure 4. The downlink MAP 4115 is configured to broadcast some parameters, such as CIDs, sub-channel offsets, or time offsets, used for downlink data transmission in the two-hop relay wireless communication system 3. Similarly, the uplink MAP 4117 is configured to broadcast some parameters used for uplink data transmission in the two-hop relay wireless communication system 3. The RS-MAP frame 4119 is configured to storing information for allocating the MS sub-frame and the RS sub-frame in the BS frame structure 4. The information not only can be stored in the RS-MAP frame 4119, but also can be stored in other MAPs, such as the downlink MAP 4115 or the uplink MAP 4117, etc.

The RS downlink receiving sub-frame 411 is configured to transmit data from the BS 301 to the RS 303. In other words, the RS downlink receiving sub-frame 411 also can be indicated as a BS downlink transmitting sub-frame. After transmission of the data of the RS downlink receiving sub-frame 411, an RS-RTG 43 occurs late than the RS downlink receiving sub-frame 411. The MS downlink receiving sub-frame 413 is configured to transmit data from the BS 301 to the first MS 305 or to transmit data from the BS 301 to the second MS 307. The MS downlink receiving sub-frame 413 is further configured to transmit data from the RS 303 to the first MS 305. More specifically, the first MS 305 can receive the data transmitted by the BS 301 and the data transmitted by the RS 303 at the same time. After data transmission of the MS downlink receiving sub-frame 413, there is an MS-RTG 44, which occurs thereafter.

The MS uplink transmitting sub-frame 421 is configured to transmit data from the first MS 305 to the BS 301 or from the second MS 307 to the BS 301. After transmission of the data of the MS uplink transmitting sub-frame 421, an RS-RTG 45 occurs thereafter.

The RS uplink transmitting sub-frame 423 is configured to transmit data from the RS 303 to the BS 301. After transmission of the data of the RS uplink transmitting sub-frame 423, a BS-RTG 46 then occurs.

The RS frame structure 5 comprises an RS downlink receiving sub-frame 511, an MS downlink receiving sub-frame 513, an MS uplink transmitting sub-frame 521, and an RS uplink transmitting sub-frame 523. Each of these sub-frames can be used by the RS 303 for downlink or uplink data transmission in the two-hop relay wireless communication system 3. The x-axis in FIG. 5 represents the time axis of the RS frame structure 5, while the y-axis represents the frequency axis.

The MS downlink receiving sub-frame 513 is configured to transmit data from the RS 303 to the first MS 305. After transmission of the data of the MS downlink receiving sub-frame 513, an MS-RTG 54 occurs thereafter. The MS uplink transmitting sub-frame 521 is configured to transmit data from the first MS 305 to the RS 303. After transmission of the data from the MS uplink transmitting sub-frame 521, an RS-RTG 55 occurs thereafter.

Since the RS frame structure 5 is used in the RS 303, the RS downlink receiving sub-frame 511 is configured to transmit data from the BS 301 to the RS 303, and the RS uplink transmitting sub-frame 523 is configured to transmit data from the RS 303 to the BS 301. In addition, similarly to the BS frame structure 4, an MS-RTG 54 and a BS-RTG 56 still remain in the RS frame structure 5.

From FIG. 3, when a first data is to be transmitted from the BS 301 of the two-hop relay wireless communication system 3 to the first MS 305, it can be transmitted directly via the MS downlink receiving sub-frame 413 or forwarded via the RS 303. When the first data is selected for direct transmission to the first MS 305 via the MS downlink receiving sub-frame 413 and forwarded via the RS 303 at the same time, the BS 301 will prepare a second data that is partially and/or entirely the same as the first data according to the information of the RS-MAP frame 4119 in the BS frame structure 4. Thus, the RS 303 can transmit the second data to the first MS 305 via the MS downlink receiving sub-frame 513 to complete transmission of the first data.

In order for the second data to be transmitted successfully to the first MS 305, the BS 301 transmits a third data containing the second data, therein, to the RS 303 via the RS downlink receiving sub-frame 411. Subsequently, the RS 303 forwards the second data to the first MS 305 via the MS downlink receiving sub-frame 513 at the same time when the BS 301 is transmitting the first data directly to the first MS 305 via the MS downlink receiving sub-frame 413.

Upon simultaneously receiving the first data from the BS 301 and the second data forwarded by the RS 303, the first MS 305 verifies the accuracy of the receive data by comparing the first data with the second data that is partially and/or entirely the same as the first data. Through such verification, an improved signal to noise rate (SNR) can be achieved with the first data, and a correct transmission of the first data from the BS 301 to the first MS 305 can be ensured.

Furthermore, in a multi-hop relay wireless communication system, data may also be transmitted by using frame structures and corresponding configurations described in the first embodiment. Likewise, these configurations will result in an improved SNR regarding data reception, and ensures correct data transmission.

Figure 6:
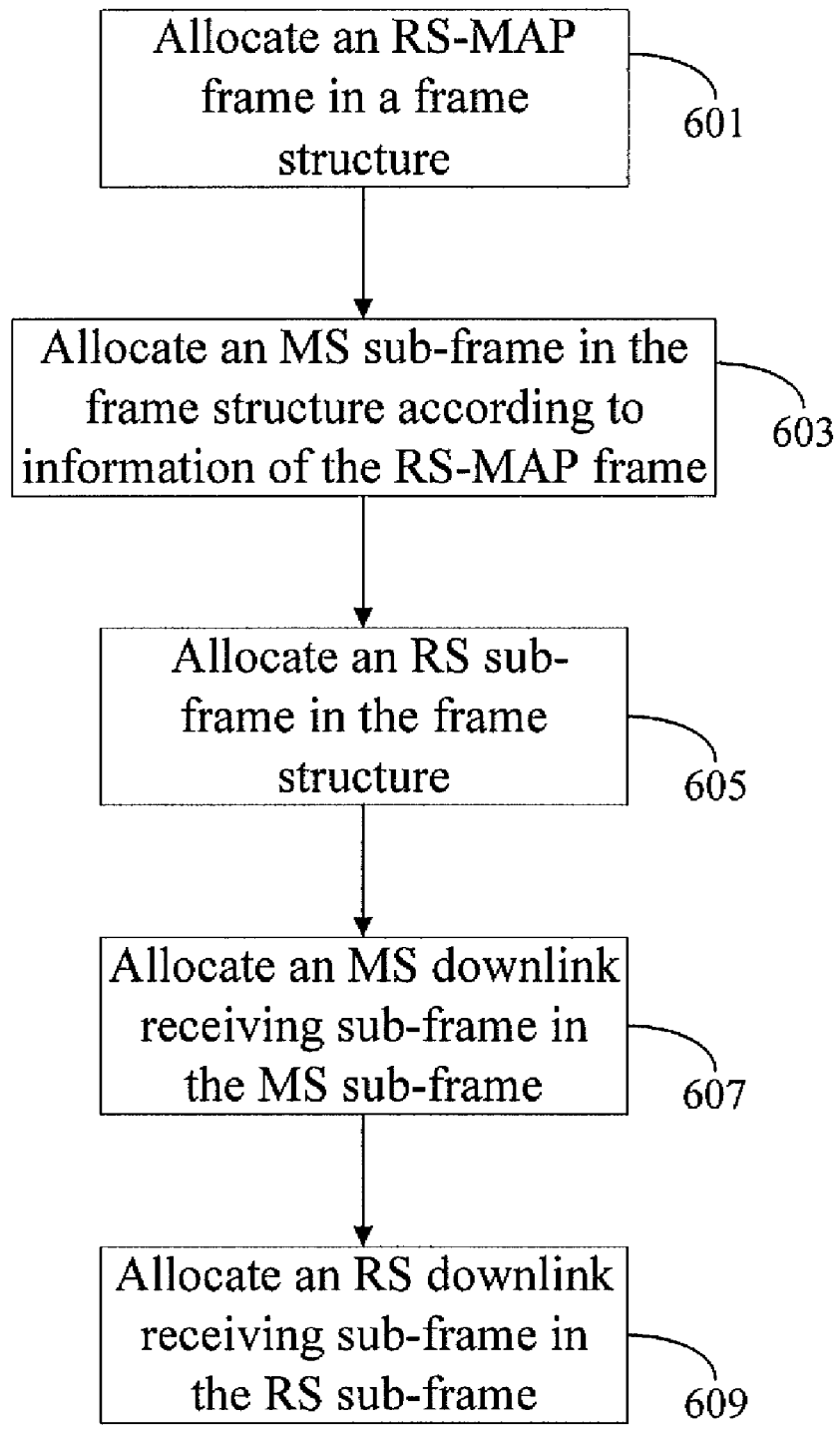
FIG. 6 is a flow chart of the second embodiment of this invention.

A second embodiment of this invention is a method for transmitting data based on a frame structure of the IEEE 802.16j, which is a method applied to the two-hop relay wireless communication system 3 described in the first embodiment. More specifically, the data transmission method of the second embodiment which is illustrated in FIG. 6 can be implemented by an application program controlling various modules of a wireless communication apparatus in the two-hop relay wireless communication system 3. This application program may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In step 601, an RS-MAP frame is allocated in a frame structure. Next in step 603, an MS sub-frame is allocated in the frame structure according to information of the RS-MAP frame. The MS sub-frame is configured to transmit the first data between BS and MS and the second data between an RS and the MS in the two-hop relay wireless communication system 3. The first data is partially and/or entirely the same as the second data. Subsequently in step 605, an RS sub-frame is allocated in the frame structure. Then, in step 607, an MS downlink receiving sub-frame is allocated in the MS sub-frame. Finally in step 609, an RS downlink receiving sub-frame is allocated in the RS sub-frame.

In addition to the steps revealed in FIG. 6, the second embodiment can also execute all the operations of the first embodiment, in which those skilled in the art can understand the corresponding steps and operations of the second embodiment by the explanation of the first embodiment, and thus no unnecessary detail is given.

Accordingly, by simultaneously transmitting partially and/or entirely the same data from both a base station and a relay station to a mobile station, this invention can prevent failure of data transmission due to the destination or forced transmission interruption due to signal interference. This invention further improves signal immunity against interference (i.e., to improve the SNR of the mobile station experiencing data receipt) and thereby, ensure correct transmission of data.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for transmitting data based on a frame structure of a multi-hop relay standard, the method being used in a wireless communication system, the method comprising steps of:

enabling the wireless communication system to allocate a relay station map (RS-MAP) frame in the frame structure to describe the frame structure;

enabling the wireless communication system to allocate a mobile station (MS) sub-frame in the frame structure according to information of the RS-MAP frame, the MS sub-frame is configured to be used for transmitting a first data between a base station (BS) and an MS, and for transmitting a second data between a relay station (RS) and the MS; and enabling the wireless communication system to allocate an RS sub-frame in the frame structure according to information of the RS-MAP frame, wherein the RS sub-frame is configured to be used for transmitting a third data between the BS and the RS, and the third data comprises the second data, wherein a part of the second data is the same as the first data, and the first data transmitted by the BS and the second data transmitted by the RS are received by the MS at the same time so that the MS is able to verify the accuracy of the received data by comparing the first data with the second data to obtain an improved signal to noise rate.

2. The method as claimed in claim 1, further comprising a step of:
enabling the wireless communication system to allocate an RS downlink receiving sub-frame in the RS sub-frame, the RS downlink receiving sub-frame is configured to be used for transmitting the third data from the BS to the RS.

3. The method as claimed in claim 1, further comprising a step of:
enabling the wireless communication system to allocate an MS downlink receiving sub-frame in the MS sub-frame, the MS downlink receiving sub-frame is configured to be used for transmitting the first data from the BS to the MS.

4. The method as claimed in claim 1, further comprising a step of:
enabling the wireless communication system to allocate an MS downlink receiving sub-frame in the MS sub-frame, the MS downlink receiving sub-frame is configured to be used for transmitting the second data from the RS to the MS.

5. A wireless communication system for transmitting data based on a frame structure of a multi-hop relay standard, the wireless communication system comprising:
a base station;
a relay station; and
at least a mobile station;
wherein the wireless communication system is responsible for allocating a frame structure, a relay station map (RS-MAP) frame is for describing the frame structure, a mobile station (MS) sub-frame is according to information of the RS-MAP frame, the MS sub-frame is configured to be used for transmitting a first data between the BS and the MS, and a second data is transmitted between the RS and the MS, an RS sub-frame is according to information of the RS-MAP frame, the RS sub-frame is configured to be used for transmitting a third data between the BS and the RS, and the third data comprises the second data;
wherein a part of the second data is the same as the first data, the first data transmitted by the BS and the second data transmitted by the RS are received by the MS at the same time, and the MS verifies the accuracy of the received data by comparing the first data with the second data to obtain an improved signal to noise rate.

6. The wireless communication system as claimed in claim 5, wherein the RS sub-frame further comprises an RS downlink receiving sub-frame, the RS downlink receiving sub-frame is configured to be used for transmitting the third data from the BS to the RS.

7. The wireless communication system as claimed in claim 5, wherein the MS sub-frame further comprises an MS downlink receiving sub-frame, the MS downlink receiving sub-frame is configured to be used for transmitting the first data from the BS to the MS.

8. The wireless communication system as claimed in claim 5, wherein the MS sub-frame further comprises an MS downlink receiving sub-frame, the MS downlink receiving sub-frame is configured to be used for transmitting the second data from the RS to the MS.

9. The wireless communication system as claimed in claim 5, wherein the frame structure is a transparent RS frame structure.

10. A non-transitory machine-readable medium having executable code to cause a machine to perform a method for transmitting data based on a frame structure of a multi-hop relay standard, the method comprising steps of:
allocating a relay station map (RS-MAP) frame in the frame structure to describe the frame structure;
allocating a mobile station (MS) sub-frame in the frame structure according to information of the RS-MAP frame, the MS sub-frame is configured to be used for transmitting a first data between a base station (BS) and an MS and for transmitting a second data between a relay station (RS) and the MS; and
allocating an RS sub-frame in the frame structure according to information of the RS-MAP frame, wherein the RS sub-frame is configured to be used for transmitting a third data between the BS and the RS, and the third data comprises the second data,
wherein a part of the second data is the same as the first data, the first data transmitted by the BS and the second data transmitted by the RS are received by the MS at the same time so that the MS is able to verify the accuracy of the received data by comparing the first data with the second data to obtain an improved signal to noise rate.

11. The non-transitory machine-readable medium as claimed in claim 10, wherein the method further comprises a step of:
allocating an RS downlink receiving sub-frame in the RS sub-frame, the RS downlink receiving sub-frame is configured to be used for transmitting the third data from the BS to the RS.

12. The non-transitory machine-readable medium as claimed in claim 10, wherein the method further comprises a step of:
allocating an MS downlink receiving sub-frame in the MS sub-frame, the MS downlink receiving sub-frame is configured to be used for transmitting the first data from the BS to the MS.

13. The non-transitory machine-readable medium as claimed in claim 10, wherein the method further comprises a step of:
allocating an MS downlink receiving sub-frame in the MS sub-frame, the MS downlink receiving sub-frame is configured to be used for transmitting the second data from the RS to the MS.

* * * * *